US005507121A

United States Patent [19]
Taylor

[11] Patent Number: 5,507,121
[45] Date of Patent: Apr. 16, 1996

[54] MOTORCYCLE GARAGE

[76] Inventor: Gary L. Taylor, 715 S. Upas St., Escondido, Calif. 92025

[21] Appl. No.: 293,551

[22] Filed: Aug. 22, 1994

[51] Int. Cl.$^6$ ..................................................... E04H 6/02
[52] U.S. Cl. .................. 52/66; 52/72; 52/174; 52/DIG. 14; 49/40
[58] Field of Search .................. 52/66, 72, 174, 52/DIG. 14, 67; 49/40, 41; 70/95, 98, 100

[56] References Cited

U.S. PATENT DOCUMENTS

| | | | |
|---|---|---|---|
| 636,491 | 11/1899 | Cohen | 49/40 |
| 1,572,790 | 5/1925 | Grigsby . | |
| 2,610,366 | 9/1952 | McKee et al. | 49/40 |
| 3,367,073 | 9/1965 | Seiger . | |
| 3,600,912 | 2/1970 | Foreman | 70/95 X |
| 3,797,178 | 3/1974 | Mule . | |
| 3,861,092 | 1/1975 | Dale et al. | 52/66 |
| 3,949,528 | 4/1976 | Hartger et al. | 52/174 X |
| 4,306,390 | 12/1981 | Brown . | |
| 4,800,701 | 1/1989 | Dunsworth . | |
| 4,876,832 | 10/1989 | Wasserman . | |
| 4,886,083 | 12/1989 | Gamache . | |
| 4,894,961 | 1/1990 | Robbins . | |
| 4,982,971 | 1/1991 | Marlin . | |

Primary Examiner—Carl D. Friedman
Assistant Examiner—Christopher Todd Kent
Attorney, Agent, or Firm—Calif Tervo

[57] ABSTRACT

A garage (10) generally comprises a pair of side walls (20, 40) that are vertical, parallel and semi-circular, and a peripheral wall (60) spanning between the periphery of the side walls (20, 40) to form an enclosure. The peripheral wall (60) includes a front door (61) and a rear door (71). Front and rear door support paths (30, 35) are located on the inside (28) of each side wall (20, 40) near the wall's peripheral edge. Each door path is parallel, semi-circular and supports a side edge of a door. The front and rear door paths (30, 35) are of different radius such that the door panels may overlap. Latching mechanisms (80), located at approximately midway up on the marginal side (38, 58) of each side wall (20, 40) are moveable to a latching position connecting a door to sidewalls (20, 40) such that the door cannot slide and such that the door prevents the side walls from outward movement at that location.

22 Claims, 3 Drawing Sheets

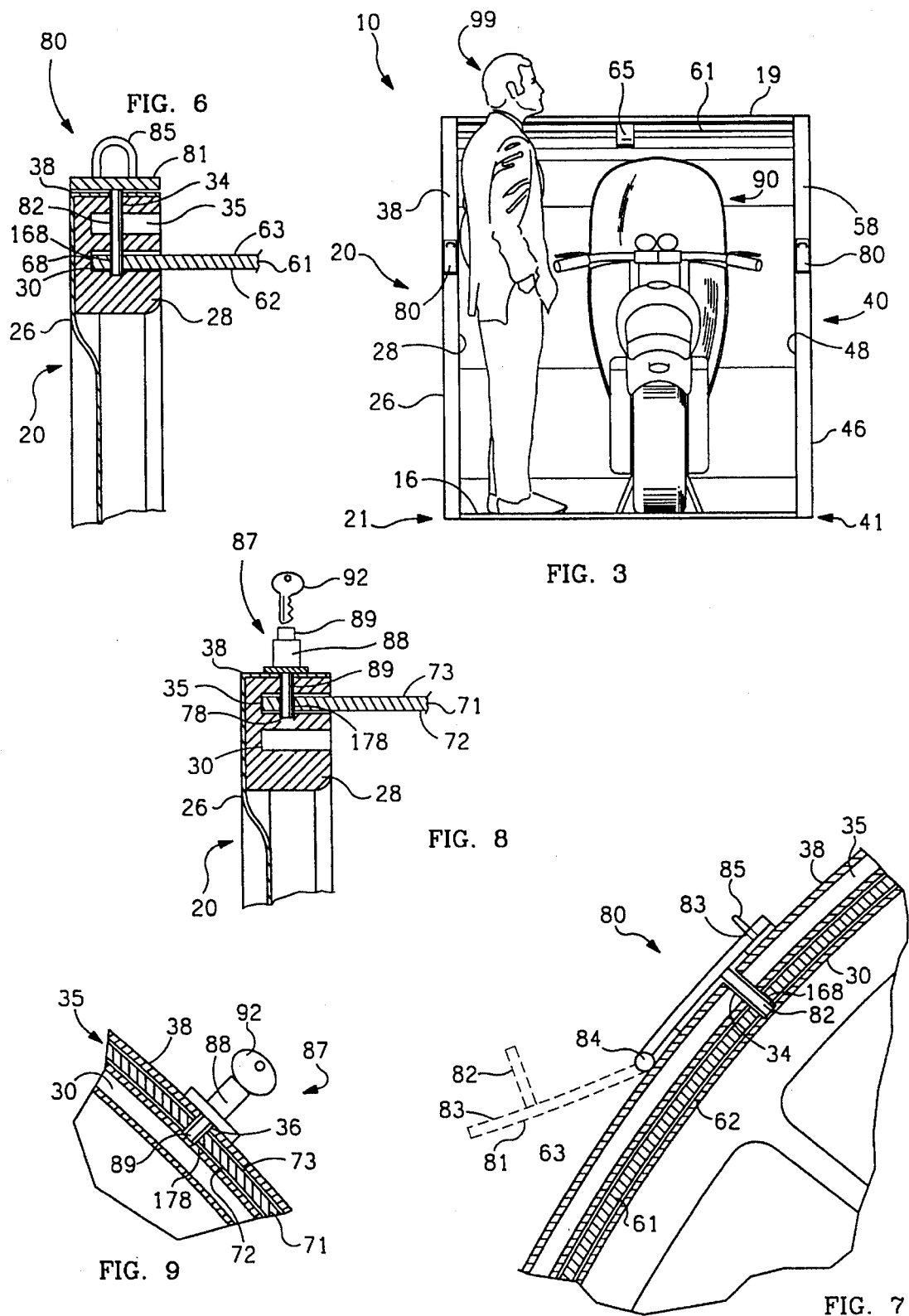

MOTORCYCLE GARAGE

BACKGROUND OF THE INVENTION

1. Field of the Invention

This invention relates in general to small garages and more specifically involves a garage having substantially rigid planar doors that are supported by and slide in arcuate channels.

2. Background of the Invention

The need for a garage for a small vehicle, such as a motorcycle or snowmobile, has been recognized for some time.

Such a garage should provide protection against the natural elements of rain and weather so as to keep the vehicle clean and dry for sitting upon by users and to prevent rust and deterioration.

Also, the garage should provide protection against theft and vandalism.

Typically, motorcycles and snowmobiles do not have a reverse. Therefore, it is further desirable that the garage allow the vehicle to enter and exit with forward travel.

Preferably, such a garage should occupy as little space as possible so as not to impinge on additional surrounding space when the garage is used.

Preferably, such as garage does not require great strength to operate.

Preferably, such a garage may be easily disassembled for transport.

These and other objectives are reached in the garage of the invention.

SUMMARY OF THE INVENTION

This invention is a garage and it generally comprises a pair of side walls that are vertical, parallel and semi-circular, and a peripheral wall spanning between the periphery of the side walls to form an enclosure. The peripheral wall includes a front door that is supported by arcuate paths on the inside of the side walls.

In an exemplary embodiment, the peripheral wall generally comprises a front door and a rear door. Front and rear door support paths are located on the inside of each side wall near the wall's peripheral edge. Each door path is parallel, semi-circular and supports a side edge of a door. The front and rear door paths are of different radius such that the door panels may overlap. Each door is a substantially rigid planar sheet that is arcuate in side view.

Latching mechanisms are located at approximately midway up on the marginal side of each side wall. The latching mechanisms are moveable to a latching position connecting a door to the sidewalls such that the door cannot slide and such that the door prevents the side walls from outward movement at that location.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 3 is a front view of the garage of FIG. 2.

FIG. 6 is an enlarged sectional view taken on line 6—6 of FIG. 5 showing the door paths and a latch.

FIG. 7 is an enlarged sectional view of the latch taken on line 7—7 of FIG. 4.

FIG. 8 is an enlarged sectional view of an alternate embodiment of a latch taken on line 8—8 of FIG. 5.

FIG. 9 is an enlarged sectional view of the alternate embodiment of a latch taken on line 9—9 of FIG. 4.

DETAILED DESCRIPTION OF THE INVENTION

Figure 1:
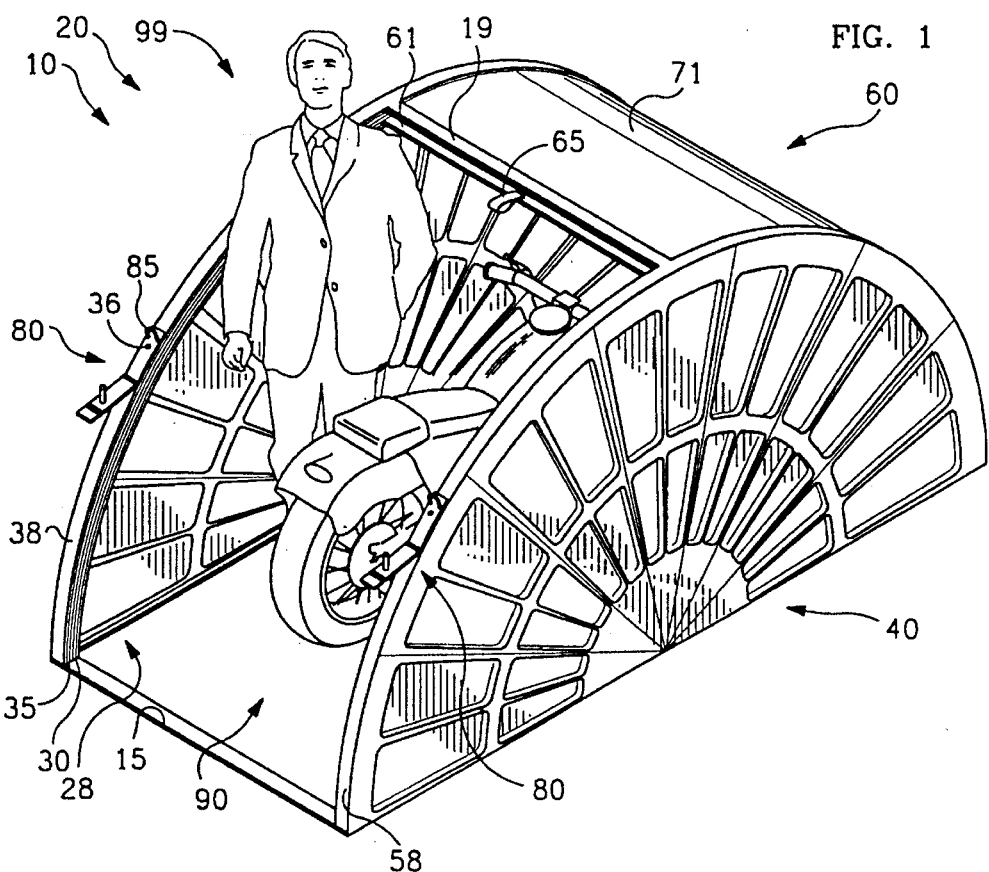
FIG. 1 is a front elevated perspective view of a preferred embodiment of the garage of the invention showing the front door open and also showing a person and motorcycle therein.
Figure 2:
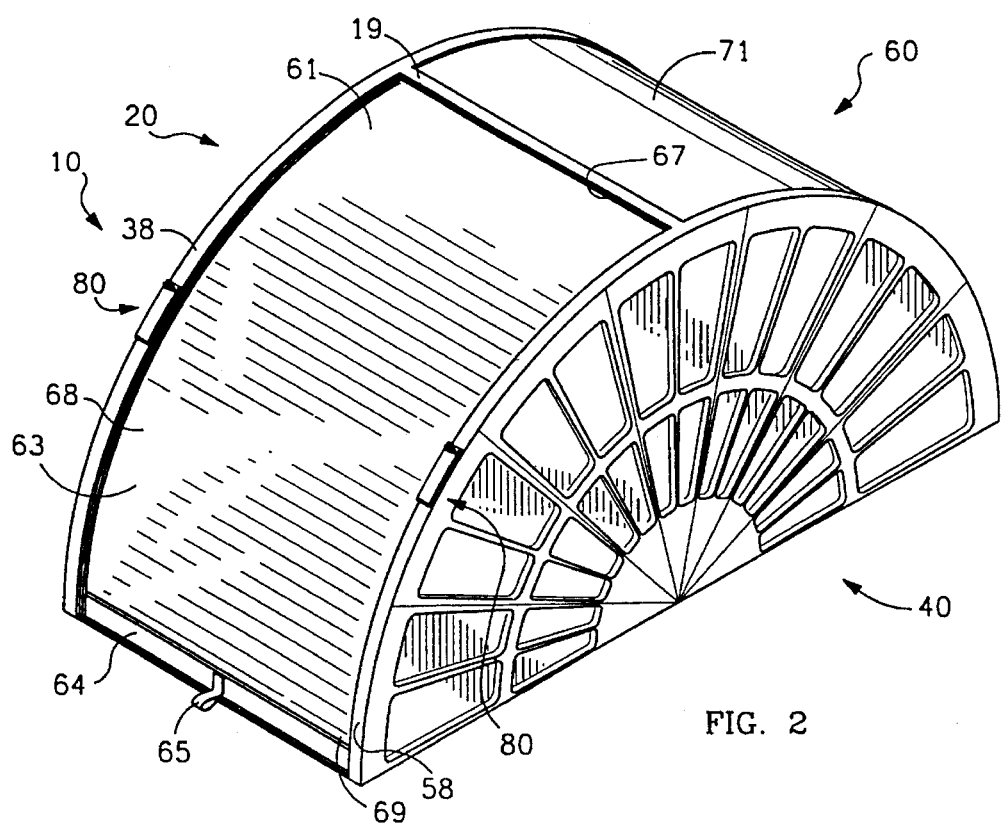
FIG. 2 is a front elevated perspective view of the garage of FIG. 1 with the front door closed.
Figure 4:
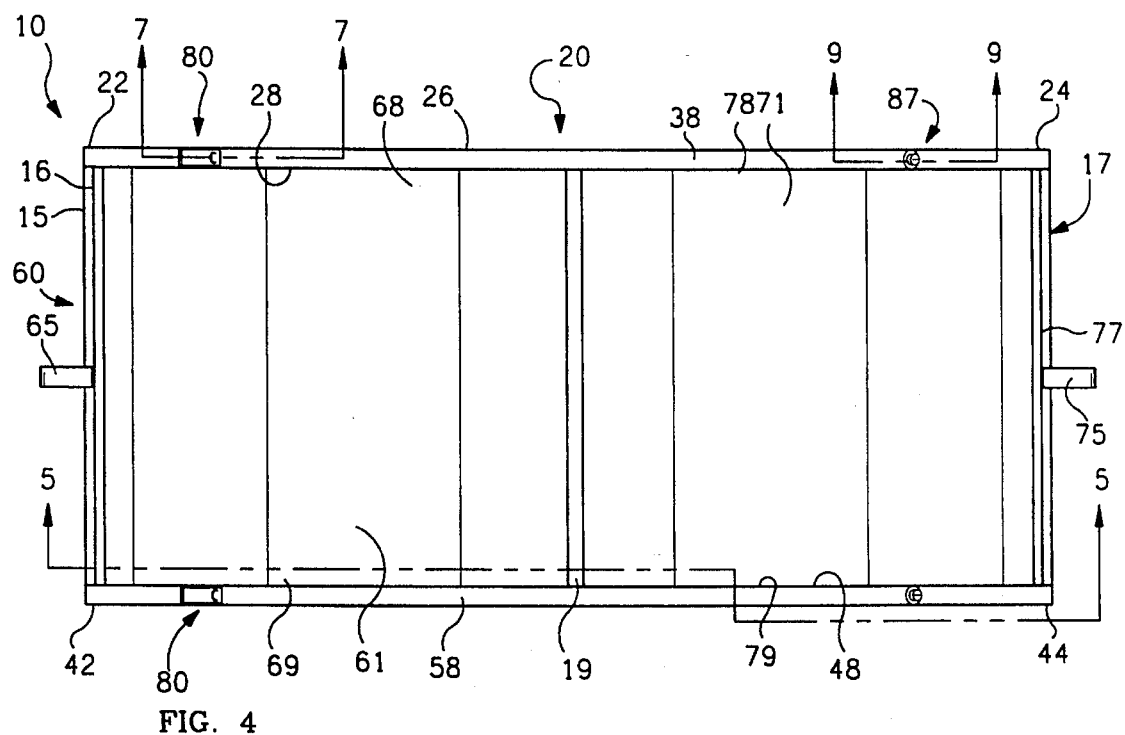
FIG. 4 is a top plan view of the garage of FIG. 2.
Figure 5:
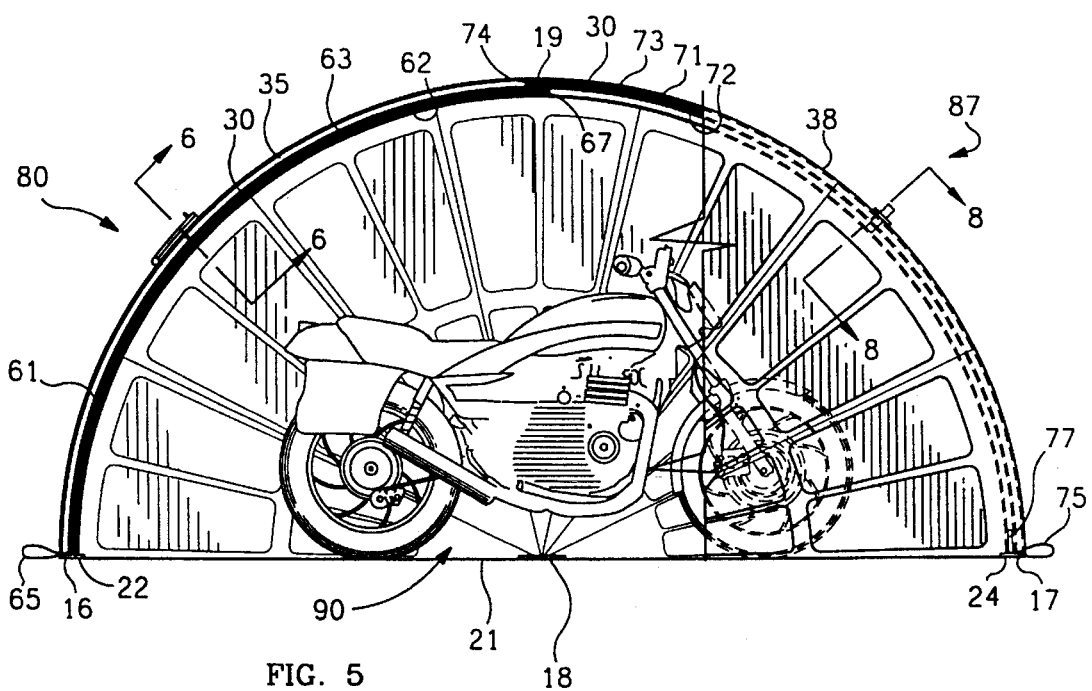
FIG. 5 is a right side sectional view taken on line 5—5 of FIG. 4.

With reference now to the drawings and more particularly to FIGS. 1–5 thereof, there is shown a preferred embodiment of the motorcycle garage, denoted generally as 10, of the invention. FIG. 1 is a front elevated perspective view of a preferred embodiment of garage 10 of the invention showing front door 61 open and also showing a person 99 and motorcycle 90 therein. FIG. 2 is a front elevated perspective view, partially cut away, of garage 10 of FIG. 1 with front door 61 closed. FIG. 3 is a front view of garage 10 of FIG. 2. FIG. 4 is a top plan view of garage 10 of FIG. 2 and FIG. 5 is a right side sectional view taken on line 5—5 of FIG. 4.

Garage 10 generally comprises left side wall 20, right side wall 40 and a peripheral wall 60 spanning therebetween defining an enclosure.

Peripheral wall 60 generally comprises front door 61 and rear door 71. Front door 61 has an inner surface 62, outer surface 63, a front end 64, a rear end 67, a left side edge 68 and a right side edge 69. Rear door 71 has an inner surface 72, outer surface 73, a front end 74, a rear end 77, a left side edge 78 and a right side edge 79.

As shown, side walls 20, 40 are spaced apart, vertical, semi-circular and parallel to one another. Side walls 20, 40 are mirror images of one another. Left side wall 20 generally includes a marginal side 38 along the periphery of the circumference, a bottom 21 having a front end 22 and a rear end 24, an outer side 26 and an inner side 28. Right side wall 40, spaced apart from left side wall 20, generally includes a marginal side 58 along the periphery of the circumference, a bottom 41 having a front end 42 and a rear end 44, an outer side 46 and an inner side 48 facing left side wall inner side 28. Preferably, walls 20,40 are constructed of strong rigid material.

A bottom traverse member, denoted generally as 15, connects side wall bottoms 21,41 in a fixed, spaced-apart relationship. Bottom traverse member 15 may be a solid floor connecting side bottoms 21,41 throughout their length or may be comprised of two or more separated members, such as is shown, with front traverse member 16 connecting side wall bottom front ends 22, 42, rear traverse member 17 connecting side wall bottom rear ends 24, 44, and middle traverse member 18 connecting the middle of side wall bottoms 21, 41. In the preferred embodiment, traverse members 16,17,18 are flat steel such that a motorcycle or snowmobile or the like can easily pass over them.

A top traverse member 19 of flat steel connects the top or apex of side walls 20, 40 in a fixed, spaced-apart relationship.

Inner sides 28, 48 of each side wall 20, 40 include a front door support path 30, 50, respectively for supporting side edges 68, 69, respectively, of front door 61. Preferably, front door paths 30, 50 are parallel semi-circular arcs and are disposed slightly radially inward of marginal sides 38, 58 and are parallel thereto, just being of smaller radius. As best seen in FIG. 5, front door paths 30,50 are disposed substantially from side wall bottom front ends 22, 42 to side wall bottom rear ends 24, 44. Door paths are also seen in the cut-away portions of FIG. 2.

Inner sides 28, 48 of each side wall 20, 40 include a rear door support path 35, 55, respectively for supporting side edges 78, 79, respectively, of rear door 71. Preferably, rear door paths 35, 55 are parallel semi-circular arcs and are disposed slightly radially inward of marginal sides 38, 58 and are parallel thereto, just being of smaller radius and are disposed slightly radially outward of front door support paths 30,50 and are parallel thereto, just being of larger radius. As best seen in FIG. 5, rear door paths 35,55 are disposed substantially from side wall bottom front ends 22, 42 to side wall bottom rear ends 24, 44.

Although, in the preferred embodiment, garage 10 includes two doors 61,71 that both open, it can be seen that one of the door panels could be a fixed panel such that garage 10 only opens from one end.

Front door 61 is supported in its door path 30, 50. Front door left side edge 68 supported by left side wall front door path 30 and front door right side edge 69 supported by said right side wall front door path 50. Front door 61 slidable along left and right side wall front door paths 30, 50 from a closed position wherein front door front end 64 is disposed near bottom front ends 22, 42 of side walls 20, 40 to an open position wherein front door front end 64 is distant from side wall bottom front ends 22, 42, thereby allowing entry to garage 10. In the preferred embodiment, shown, front door 61 opens until front end 64 is near the apex. Manipulation means, such as flexible handle 65 attached to front end 64 is used for grasping by an operator to move door 61 back and forth between the closed and open positions.

Rear door 71 is supported in its door path 35, 55. Rear door left side edge 78 supported by left side wall rear door path 35 and rear door right side edge 79 supported by right side wall rear door path 55. Rear door 71 slidable along left and right side wall front door paths 35, 55 from a closed position wherein rear door rear end 77 is disposed near bottom rear ends 24, 44 of side walls 20, 40 to an open position wherein rear door rear end 77 is distant from side wall bottom rear ends 24, 44, thereby allowing entry to garage 10. In the preferred embodiment, shown, rear door 61 opens until rear end 77 is near the apex. Manipulation means, such as flexible handle 75 attached to rear end 77 is used for grasping by an operator to move door 61 back and forth between the closed and open positions.

It should be noted that, once opened, doors 61, 71 are entirely out of the way; that is, they do not in any manner block access to garage 10 such as restricting overhead clearance.

Preferably, doors 61, 71 are strong, rigid, planar, sheets of substantially uniform thickness and have a curvature on side view matching that of their respective support paths. Because doors 61, 71 do not have to flex or change shape at all in their movement, they may be strong, rigid members. This attribute also contributes to the ease of operation in that no work is required by an operator for flexing door material and changing the shape of the door during operation as is often the case in other garage designs. During opening and closing of doors 61, 71, the only work done is that of raising and lowering the center of gravity of doors 61, 71 a short distance and overcoming the small frictional forces of support.

FIGS. 6 and 8 illustrate a side wall construction for door support paths. FIG. 6 is a sectional view taken on line 6—6 of FIG. 5 showing left side wall door paths 30, 35 and a front latch assembly 80. Inner side 28 of left side wall 20 includes rear door support path 35 in the form of a channel for receiving rear door left edge 78 and includes front door support path 30 in the form a channel for receiving front door left edge 68. The right side wall construction is the mirror image.

Two preferred embodiments of latch assemblies are shown, front latch assemblies 80 and rear latch assemblies 87. Both prevent movement of their respective door and both connect the side walls to the door such that the side walls cannot be moved outward at that location. Both assemblies 80, 85 can be easily modified to perform the above roles of the other.

Front latch assembly 80 is best seen in FIGS. 6 and 7. FIG. 6 is a sectional view taken on line 6—6 of FIG. 5 showing left side wall door paths 30, 35 and front latch assembly 80. FIG. 7 is a sectional view of front latch assembly 80 taken on line 7—7 of FIG. 4 with the unlatched position shown in phantom. Front latch assemblies 80 are located at approximately midsection between bottom fronts 22, 42 and the apex. Front latch assemblies have a latching position preventing front door 61 from sliding and connecting front door to sidewalls 20, 40 such that front door 61 prevents side walls 20, 40 from outward movement at the latch location and have an unlatched position not preventing door 61 from sliding.

A left front latch assembly is shown and described, the right front latch assembly being a mirror image. A front latch bore 34 is disposed through marginal side 38 to, at least, front door support path 30. Front door 61 includes a bore 168 therein medial of left side edge 68. Left front latch assembly 80 includes bar 81 connected by hinge assembly 84, including a hinge, to marginal side 38. Bar 81 includes a bolt 82 on its underside for insertion, in the latched position, into wall bore 34 and door bore 168 thereby preventing front door 61 from sliding and connecting front door 61 to sidewalls 20, 40 such that front door 61 prevents side walls 20, 40 from outward movement. An eye 85 connected to marginal side 38 goes through slot 83 in bar 81 for accepting a lock for holding bar 81 in the latched position. Phantom lines show bar 81 in the unlatched position. This latch design could also be used as a rear door latch.

Rear latch assembly 87 is best seen in FIGS. 8 and 9. FIG. 8 is a sectional view taken on line 8—8 of FIG. 5 showing left side wall door paths 30, 35 and rear latch assembly 87. FIG. 9 is a sectional view taken on line 9—9 of FIG. 4. Rear latch assemblies 87 are located at approximately midsection between bottom rears 24, 44 and the apex. Rear latch assemblies 87 have a latching position preventing rear door 71 from sliding and connecting rear door 71 to sidewalls 20, 40 such that rear door 71 prevents side walls 20, 40 from outward movement at the latch location and have an unlatched position not preventing door 71 from sliding.

A left rear latch assembly 87 is shown and described, the right rear latch assembly being a mirror image. A rear wall bore 36 is disposed through marginal side 38 to, at least, door support path 35. Rear door 71 includes a bore 178 therein medial of left side edge 78. Left rear latch assembly 87 includes housing 88 connected to marginal side 38, including keyed locking bolt 89. Key 92 is inserted into locking bolt 89 for activation. Locking bolt 89 is movable from an inserted position, in the latched position, into wall bore 36 and door bore 178 thereby preventing front door 71 from sliding and connecting rear door 61 to sidewalls 20, 40 such that rear door 71 prevents side walls 20, 40 from outward movement to a retracted position wherein it is not within rear door bore 178. Latches of this design are known and commercially available. This latch design, with a longer bolt 89, could also be used as a front door latch.

Having described the invention, it can be seen that it provides a very convenient device for storage of a motorcycle or snowmobile. With two doors, a motorcycle or snowmobile may be driven in through front door 61 and out through rear door 71.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A garage comprising:
   a left side wall including:
      a horizontal bottom having: a front end; and a rear end;
      an outer side;
      an inner side including:
         an arcuate front door support path for a left side edge of a front door; said left side wall front door path disposed substantially from said left side wall bottom front end to an apex and rearward therefrom substantially to said left side wall bottom rear end;
   a right side wall spaced apart from said left side wall including:
      a horizontal bottom having:
         a front end; and
         a rear end;
      an outer side;
      an inner side facing said left side wall inner side including:
         an arcuate front door support path for a right side edge of a front door; said right side wall front door path disposed substantially from said right side wall bottom front end to an apex and rearward therefrom substantially to said right side wall bottom rear end; said front door paths being parallel to one another;
   a bottom traverse member connecting said side wall bottoms in spaced apart relationship; and
   a peripheral wall spanning between said side walls including:
      a rear panel spanning between said side walls including;
         a rear end disposed near said bottom rear ends of said side walls; and
         a front end; and
      a front door spanning between said side walls including:
         a left side edge supported by said left side wall path;
         a right side edge supported by said right side wall path;
         a front end; and
         a rear end;
   said front door slidable along said paths from a closed position creating an enclosure wherein said front end is disposed near said bottom front ends of said side walls to an open position wherein said front end is distant from said bottom front ends of said side walls.

2. The garage of claim 1:
   said rear end of said front door being disposed near said bottom rear ends of said side walls when said door is in the open position.

3. The garage of claim 1 wherein:
   said front door is a substantially rigid planar sheet that is arcuate in side view.

4. The garage of claim 1 wherein:
   said path is a channel.

5. The garage of claim 1 further including:
   latching mechanisms disposed at approximately midway between said bottom fronts and the apex; said latching mechanism moveable from a latching position connecting said door to said sidewalls such that said door cannot slide and such that said door prevents said side walls from outward movement at that location to an unlatched position not preventing said door from sliding.

6. The garage of claim 1 wherein:
   each said side wall is semi-circular in side view and includes a marginal side.

7. The garage of claim 6 further including:
   a latching mechanism connected to each said marginal side at approximately midway between said bottom fronts and the apex; said latching mechanism moveable from a latching position connecting said door to said sidewalls such that said door cannot slide and such that said door prevents said side walls from outward movement at that location to an unlatched position not preventing said door from sliding.

8. A garage comprising:
   a left side wall including:
      a bottom having:
         a front end; and
         a rear end;
      an outer side;
      an inner side including:
         a front door support path for a left side edge of a front door; said left side wall front door path disposed substantially from said left side wall bottom front end to an apex and rearward therefrom;
   a right side wall spaced apart from said left side wall including:
      a bottom having:
         a front end; and
         a rear end;
      an outer side;
      an inner side facing said left side wall inner side including:
         a front door support path for a right side edge of a front door; said right side wall front door path disposed substantially from said right side wall bottom front end to an apex and rearward therefrom; said front door paths being parallel to one another and each being substantially a semi-circle and;
   a bottom traverse member connecting said side wall bottoms in spaced apart relationship; and
   a peripheral wall spanning between said side walls including:

a rear panel spanning between said side walls including;
a rear end disposed near said bottom rear ends of said side walls; and
a front end; and
a front door spanning between said side walls including:
a left side edge supported by said left side wall path;
a right side edge supported by said right side wall path;
a front end; and
a rear end;
said front door slidable along said paths from a closed position creating an enclosure wherein said front end is disposed near said bottom front ends of said side walls to an open position wherein said front end is distant from said bottom front ends of said side walls.

9. A garage comprising:
a left side wall that is semi-circular in side view including:
a marginal side;
a bottom having:
a front end; and
a rear end;
an outer side;
an inner side including:
a semi-circular front door support path for a left side edge of a front door; said left side wall front door path disposed substantially from said left side wall bottom front end to an apex and rearward therefrom;
a right side wall that is semi-circular in side view, spaced apart from said left side wall including:
a marginal side;
a bottom having:
a front end; and
a rear end;
an outer side;
an inner side facing said left side wall inner side including:
a semi-circular front door support path for a right side edge of a front door; said right side wall front door path disposed substantially from said right side wall bottom front end to an apex and rearward therefrom; said front door paths being arcuate and parallel to one another;
a bottom traverse member connecting said side wall bottoms in spaced apart relationship; and
a peripheral wall spanning between said side walls including:
a rear panel spanning between said side walls including;
a rear end disposed near said bottom rear ends of said side walls; and
a front end; and a front door spanning between said side walls including:
a left side edge supported by said left side wall path;
a right side edge supported by said right side wall path;
a front end; and
a rear end;
said front door slidable along said paths from a closed position creating an enclosure wherein said front end is disposed near said bottom front ends of said side walls to an open position wherein said front end is distant from said bottom front ends of said side walls; said front door being a substantially rigid planar sheet that is arcuate in side view.

10. A garage comprising:
a left side wall including:
a bottom having:
a front end; and
a rear end;
an outer side;
an inner side including:
a front door support path for a left side edge of a front door; said left side wall front door path disposed substantially from said left side wall bottom front end to an apex and rearward therefrom;
a rear door support path for a left side edge of a rear door; said left side wall rear door path disposed substantially from said left side wall bottom rear end to an apex and forward therefrom;
a right side wall spaced apart from said left side wall including:
a bottom having:
a front end; and
a rear end;
an outer side;
an inner side facing said left side wall inner side including:
a front door path for supporting a right side edge of a front door; said right side wall front door path disposed substantially from said right side wall bottom front end to an apex and rearward therefrom; said front door paths being arcuate and parallel to one another;
a rear door path for supporting a right side edge of a rear door; said right side wall rear door path disposed substantially from said right side wall bottom rear end to an apex and rearward therefrom; said rear door paths being arcuate and parallel to one another;
a bottom traverse member connecting said side wall bottoms in spaced apart relationship; and
a peripheral wall spanning between said side walls and creating an enclosure including:
a front door spanning between said side walls including:
a left side edge supported by said left side wall front door path;
a right side edge supported by said right side wall front door path;
a front end; and
a rear end; said front door slidable along said left and right side wall front door paths from a closed position wherein said front end is disposed near said bottom front ends of said side walls to an open position wherein said front end is distant from said bottom front ends of said side walls; and
a rear door spanning between said side walls including:
a left side edge supported by said left side wall rear door path;
a right side edge supported by said right side wall rear door path;
a front end; and
a rear end;
said rear door slidable along said rear door paths from a closed position wherein said rear end is disposed near said bottom rear ends of said side walls to an open position wherein said rear end is distant from said bottom rear ends of said side walls.

11. The garage of claim 10 wherein:
each said path is substantially an arc of a circle.

12. The garage of claim 10 further including:
a top traverse member connecting said side walls near the apex of said paths.

13. The garage of claim 10 wherein:
said front door is a substantially rigid planar sheet that is arcuate in side view.
14. The garage of claim 10 wherein:
each said path is a channel.
15. The garage of claim 1 further including:
latching mechanisms disposed at approximately midway between said bottom fronts and the apex; said latching mechanism moveable from a latching position connecting said door to said sidewalls such that said front door cannot slide and such that said front door prevents said side walls from outward movement at that location to an unlatched position not preventing said front door from sliding.
16. The garage of claim 10 wherein:
each said side wall is semi-circular in side view and includes a marginal side.
17. The garage of claim 16 further including:
a latching mechanism connected to each said marginal side at approximately midway between said bottom fronts and the apex; said latching mechanism moveable from a latching position connecting said front door to said sidewalls such that said front door cannot slide and such that said front door prevents said side walls from outward movement at that location to an unlatched position not preventing said front door from sliding.
18. The garage of claim 16 wherein:
each said path is semi-circular.
19. The garage of claim 18 wherein:
said rear door path has a different radius than said front door path.
20. The garage of claim 19 wherein:
said doors are substantially rigid planar sheets that are arcuate in side view.
21. A garage comprising:
a left side wall including:
a bottom having:
a front end; and
a rear end;
an outer side;
an inner side including:
a front door support path for a left side edge of a front door; said left side wall front door path disposed substantially from said left side wall bottom front end to an apex and rearward therefrom;
a right side wall spaced apart from said left side wall including:
a bottom having:
a front end; and
a rear end;
an outer side;
an inner side facing said left side wall inner side including:
a front door support path for a right side edge of a front door; said right side wall front door path disposed substantially from said right side wall bottom front end to an apex and rearward therefrom; said front door paths being arcuate and parallel to one another; each said side wall being semi-circular in side view and including a marginal side;
a bottom traverse member connecting said side wall bottoms in spaced apart relationship; and
a peripheral wall spanning between said side walls including:
a rear panel spanning between said side walls including:
a rear end disposed near said bottom rear ends of said side walls; and
a front end; and
a front door spanning between said side walls including:
a left side edge supported by said left side wall path;
a right side edge supported by said right side wall path;
a front end; and
a rear end;
said front door slidable along said paths from a closed position creating an enclosure wherein said front end is disposed near said bottom front ends of said side walls to an open position wherein said front end is distant from said bottom front ends of said side walls.
22. The garage of claim 21 further including:
a latching mechanism connected to each said marginal side at approximately midway between said bottom fronts and the apex; said latching mechanism moveable from a latching position connecting said door to said sidewalls such that said door cannot slide and such that said door prevents said side walls from outward movement at that location to an unlatched position not preventing said door from sliding.

* * * * *